US006798082B1

(12) United States Patent  
Chen

(10) Patent No.: US 6,798,082 B1
(45) Date of Patent: Sep. 28, 2004

(54) TURBINE WIND ENERGY GENERATOR STRUCTURE FOR THE SAME

(76) Inventor: Chin-Yih Chen, No. 39, Lane 393, Chilin Rd., Taipei City (TW)

( * ) Notice: Subject to any disclaimer, the term of this patent is extended or adjusted under 35 U.S.C. 154(b) by 0 days.

(21) Appl. No.: 10/671,450

(22) Filed: Sep. 29, 2003

(51) Int. Cl.$^7$ ................................................. H02K 9/00
(52) U.S. Cl. .............................. 290/55; 290/44; 290/43
(58) Field of Search ............................. 210/55; 290/44, 290/43

(56) References Cited

U.S. PATENT DOCUMENTS

| | | | | |
|---|---|---|---|---|
| 1,027,501 A | * | 5/1912 | Pearson | 290/5 |
| 4,012,163 A | * | 3/1977 | Baumgartner | 415/2 |
| 4,112,311 A | * | 9/1978 | Theyse | 290/44 |
| 4,224,528 A | * | 9/1980 | Argo | 290/5 |

* cited by examiner

Primary Examiner—Nicholas Ponomarenko
Assistant Examiner—Iraj A. Mohandesi
(74) Attorney, Agent, or Firm—Birch, Stewart, Kolasch & Birch, LLP

(57) ABSTRACT

A turbine wind energy generator structure comprises a turbine ventilator, a drive system, a transmission, a generator and a tower. The characteristics of the turbine wind energy generator lie in: the generation of electricity is driven by the drive system of the generator under the movement of air in chaotic vertical mass motions because of heating, the driving of chimney/stack effect and extrinsic breeze and the revolving energy resulting from the rotation of turbine ventilator because of the movement of air by way of the transmission for tuning up the rotation rate of the generator without excessive electric power, which can be stored in a battery of the generator. Therefore, the present invention enables a more economical method of utilization of wind energy to make better use of energy resources without causing to environmental pollution.

7 Claims, 6 Drawing Sheets

TURBINE WIND ENERGY GENERATOR STRUCTURE FOR THE SAME

FIELD OF THE INVENTION

The present invention relates to a turbine wind energy generator structure, and more particularly, to a turbine blade mechanism using the movement of air in chaotic vertical mass motions because of heating and the driving of chimney/stack effect and extrinsic breeze accommodating to a generator and coupled components between a ventilator and the generator for generating electric energy.

BACKGROUND OF THE INVENTION

FIG. 1A shows a large-sized wind energy generator of prior art that was usually a generator with a horizontal hub (propeller) comprising a fan a, a fan adjustment mechanism b, a transmission (accelerated gear box) c, a generator d, an automatic upwind device e and a tower f. The function of the fan a is to transform wind energy into mechanical energy, composed of a wheel axle a2 and blades a1 functioning the movement of air well installed on the wheel axle a2. The fan a is accelerated from a low speed by the accelerated gear box c to generate power to be transmitted to the generator d through the drive system g. The aforementioned components are all installed inside of an engine room h, which is fully supported by the tall tower f. Seeing that the wind direction alters often, to effectively utilize wind power the automatic upwind device e is installed for driving pinions to move big gear wheels on the tower f through the control of a deviation device e3 by a controller e2 according to the wind direction measured by a wind direction sensor e1, and in consequence the whole engine room h is capable of facing the wind because of the automatic upwind device e. There was another prior art wind energy generator with a perpendicular hub(as shown in FIG. 1B) that is affected by instable electric power generated by wind energy, so that the generation of electric power by wind energy requires extra energy storage capacity against wind falling if without supporting by other electric power sources. There exists, therefore, a need for an improved generator structure that will not requires considerable cost and space for the construction of extra energy storage capacity of the prior art.

SUMMARY OF THE INVENTION

In view of the drawbacks of aforementioned wind energy generators, a turbine wind energy generator structure is disclosed herein.

An objective of the present invention is to provide a turbine wind energy generator structure, which can reduce the cost of generating electric power and encourage greater energy efficacy.

Another objective of the present invention is to provide a turbine wind energy generator structure, which enables the utilization of a generator device to be expanded without being limited by space and location.

To achieve the above and other objectives, the present invention provides a turbine wind energy generator structure, which has a turbine ventilator with a perpendicular revolving spindle installed to enable wind from any direction to revolve blades. When air temperature between inside and outside the room differ, air with high temperature will float to the other space through gaps in turbine blades. Once air is expelled from the room, an indraft cool air from outside of the room will form a warm current, the movement of air in chaotic vertical mass motions because of heating will drive the turbine ventilator to revolve. In addition, seeing that the turbine ventilator is installed at a height of 3 meters, the temperature difference between inside and outside the room is able to form the chimney/stack effect to generate electric power by revolving the turbine ventilator. To protect the turbine ventilator from excessive speed resulting from an overrun of wind power when the turbine ventilator operates and to ensure clutch to be securely coupled to the generator, turbine ventilator blades are utilized for driving gear wheels to use generated electric power or store the electricity into its battery; in addition, a small generator and the gear wheels of the turbine ventilator are allowed to be directly combined together for generating electricity, which can be consumed by small electric equipment or excessive electric power can be stored into the battery.

In view of the foregoing, the drawbacks of the changeful wind direction and wind capacity require the prior art generator structures to spend a plenty of technologies and costs for improvement and to verify the size and the establishment of the tower as appropriate. The present invention is able to take the three chief considerations of the movement of air in chaotic vertical mass motions because of heating, chimney/stack effect and natural breeze applying the turbine ventilator whereof with a perpendicular revolving spindle to be installed on various locations, such as the countryside, fish farms, flower nurseries, housetops of factories with sky-view terraces, exhausts of apartment buildings, street lights and traffic lights. Moreover, the energy efficiency of the generator of the present invention far surpasses most of prior art wind energy generators available on the mass market.

DETAILED DESCRIPTION OF THE PREFERRED EMBODIMENTS

Figure 1A:
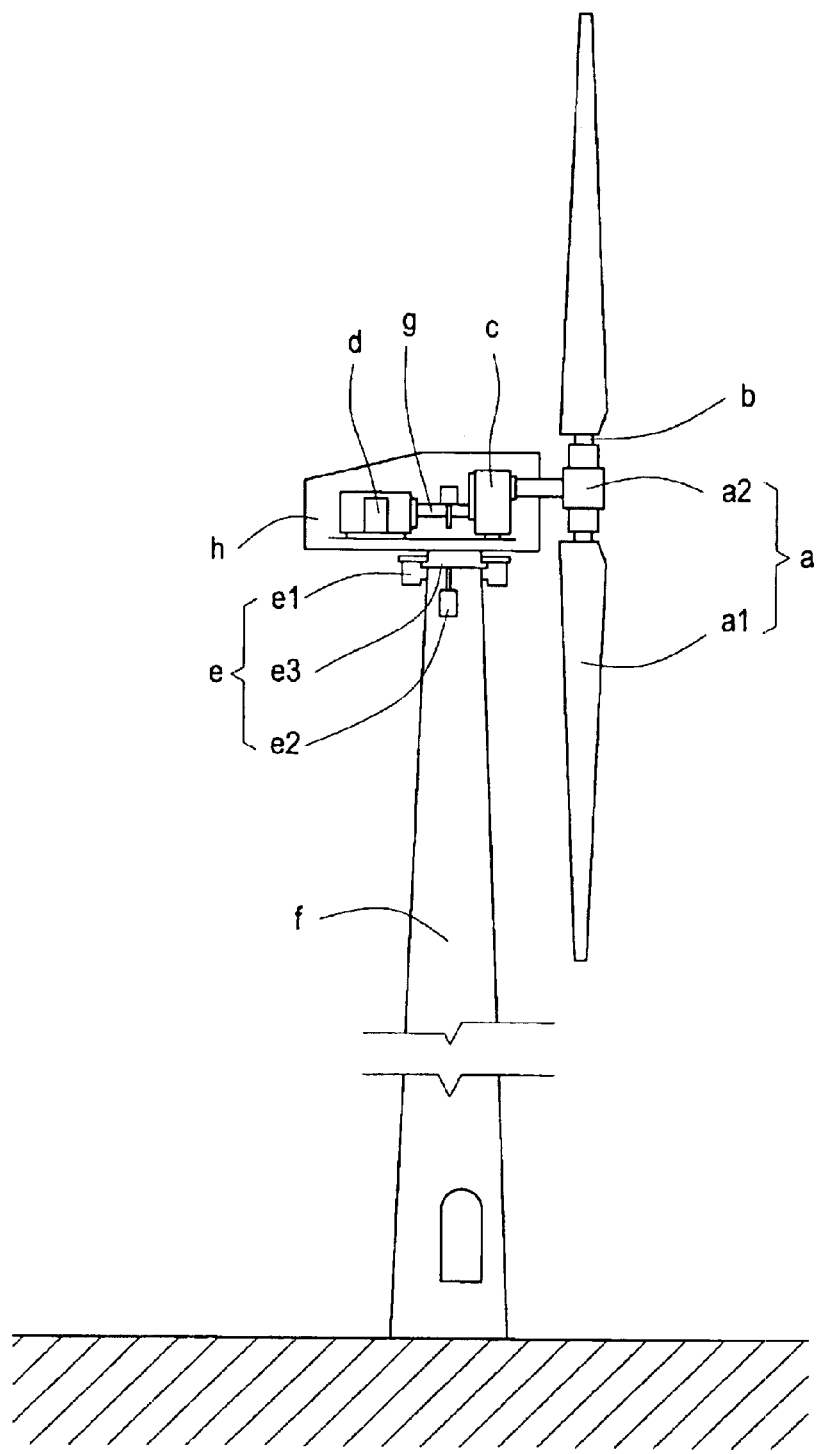
FIG. 1A is a perspective view of a prior art generator with a horizontal hub.
Figure 1B:
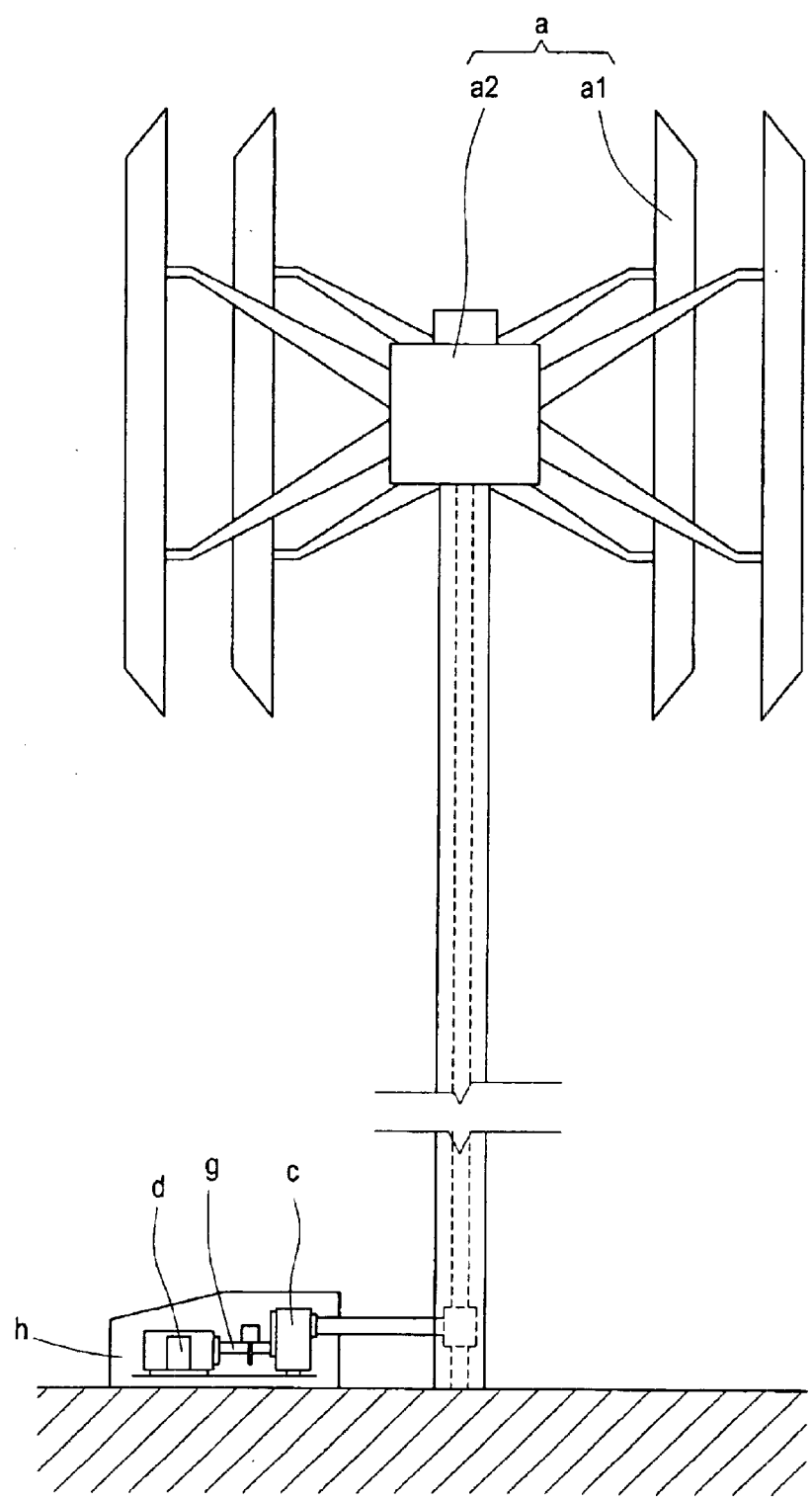
FIG. 1B is a perspective view of a prior art generator with a perpendicular hub.
Figure 2:
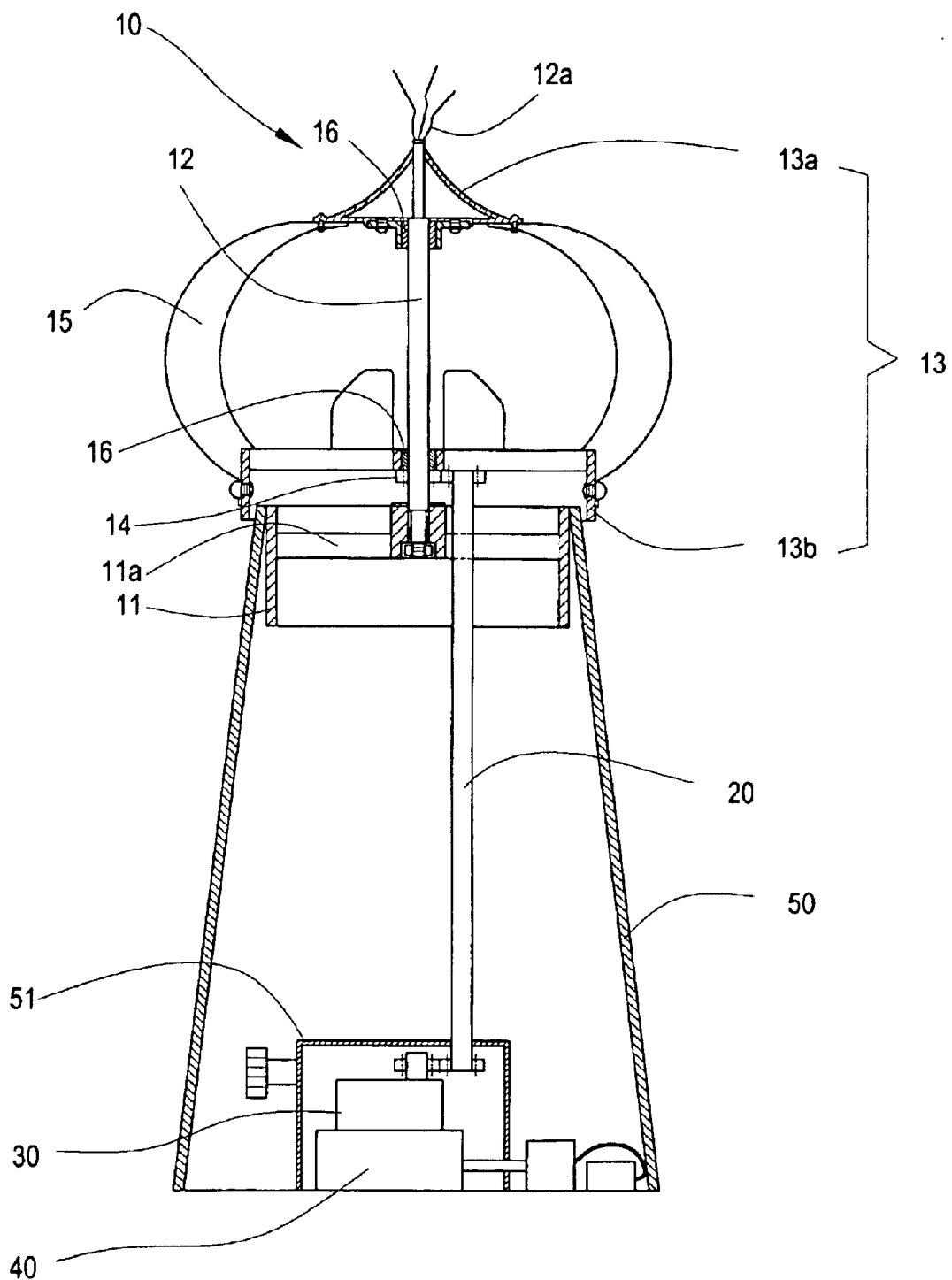
FIG. 2 is a sectional view of the invention.
Figure 3:
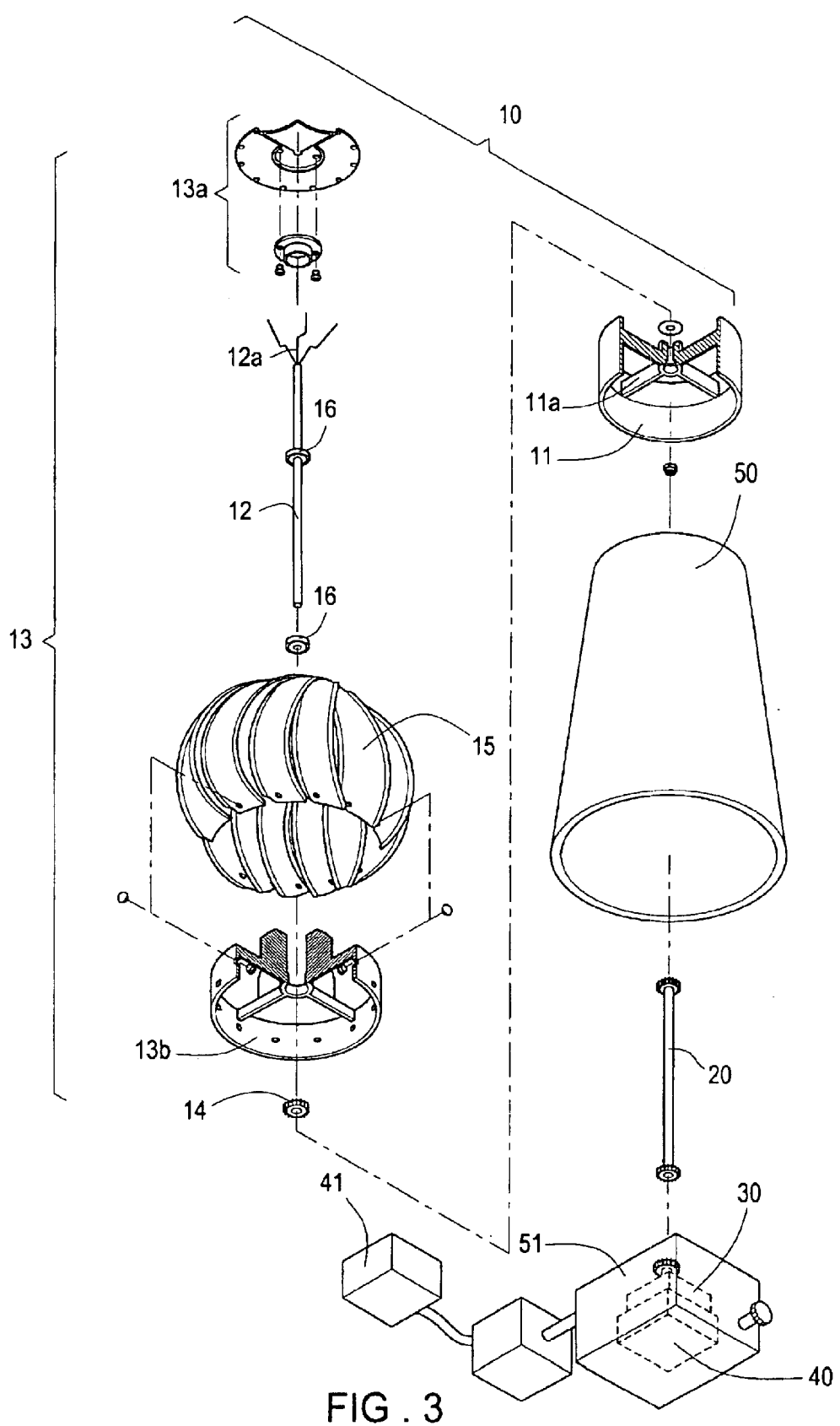
FIG. 3 is an exploded perspective view of the invention.

The present invention can be more fully understood by reading the following detailed description of a preferred embodiment, with reference made to the accompanying drawings, wherein As shown in FIG. 2 and 3 that the turbine wind energy generator structure of the present invention comprises a turbine ventilator 10, a drive system 20, a transmission 30, a generator 40 and a tower 50. The turbine ventilator 10 has an immovable frame 11, on the center of which a upright fixed shaft 12 is installed. The immovable frame 11 is tubular shaped with several struts 11a set wherein. A hub 13 is a round shape installed on top of the fixed shaft 12 and the immovable frame 11 having a bearing 16 installed in the center whereof. The bearing 16 is coupled with the fixed shaft 12. A gear wheel 14 is mounted under the center of a lower hub 13b and synchronously revolved together with the lower hub 13b. Several screw blades 15 are positioned on the lateral sides of the upper and the lower hubs 13a and 13b. A lightning conductor device 12a is positioned on the top of the fixed shaft 12 above the upper hub 13a. In addition, the entire turbine ventilator 10 is fixed on the tower 50 because of the immovable frame 11. The tower is a hollow casing, which can be either geometrical or irregular shape. A control cabinet 51 having the transmission 30 and the generator 40 installed inside whereof is positioned at the bottom of the tower 50. The gear wheel 14 and the transmission 30 transmit revolving energy by way of the drive system 20. Seeing that the revolving spindle of the turbine ventilator 10 is vertical and wind from any direction enables the blades 15 on the revolving spindle to be revolved; therefore, when air temperature between inside and outside the room differ, air with high temperature will float to the other space through gaps in turbine blades 15 forming a warm current, the movement of air in chaotic vertical mass motions because of heating to drive the blades 15 of the turbine ventilator to revolve. Moreover, the turbine ventilator 10 is installed at a height of 3 meters, the temperature difference between inside and outside the room is able to form the chimney/stack effect to generate electric power by revolving the turbine ventilator 10, of which blades 15 can drive the upper and the lower hubs 13a and 13b. The lower hub 13b is coupled to the gear wheel 14 and is able to transmit the revolving energy of the turbine ventilator 10 to the transmission 30 by way of the movements of the gear wheel 14 and the drive system 20. The transmission 30 then enlarges the wind speed for generating wind energy to be transmitted to the generator 40 for supplying electric power, excessive electric power is sequentially stored in a battery 41.

Figure 4:
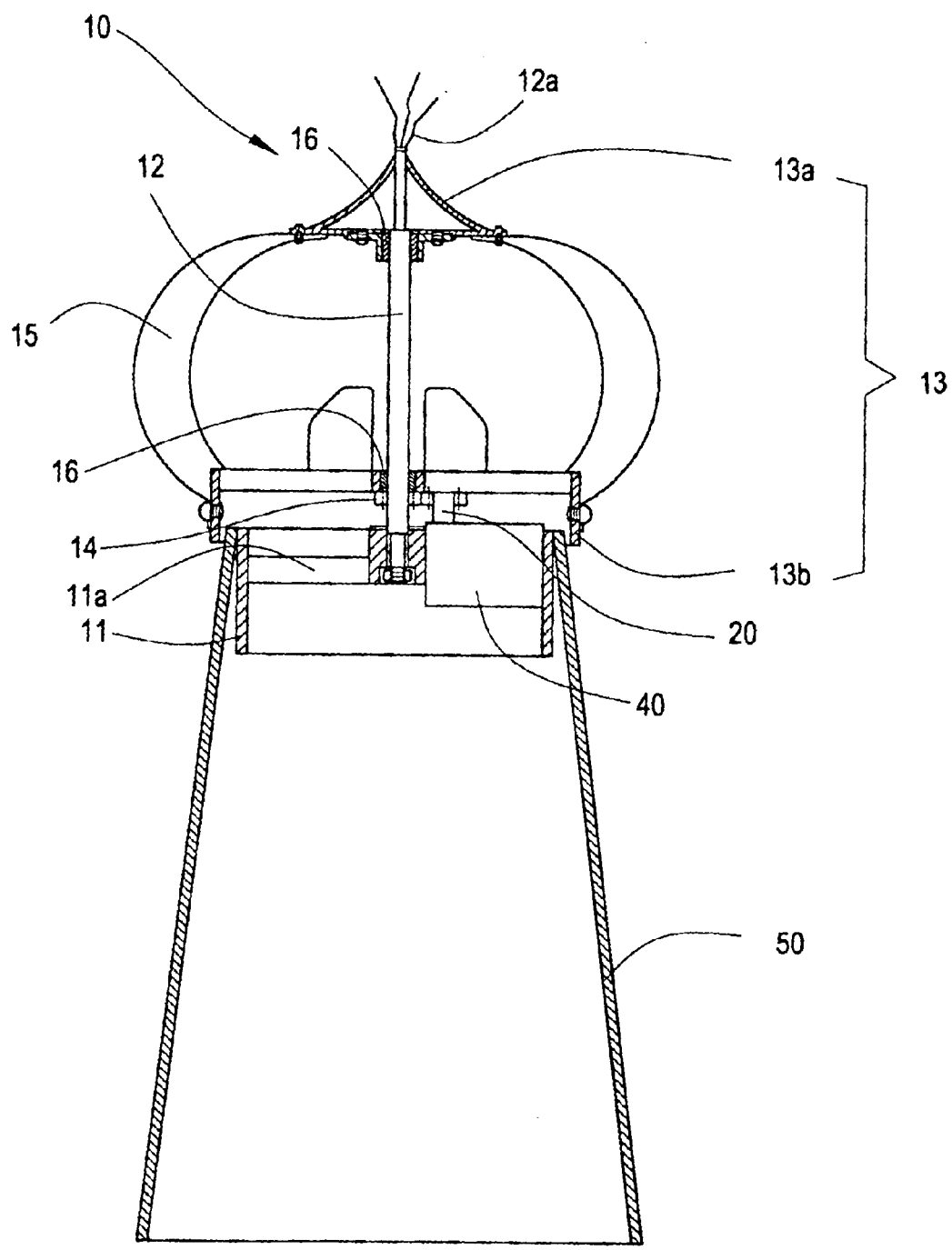
FIG. 4 is a sectional view of another preferred embodiment of the invention.
Figure 5:
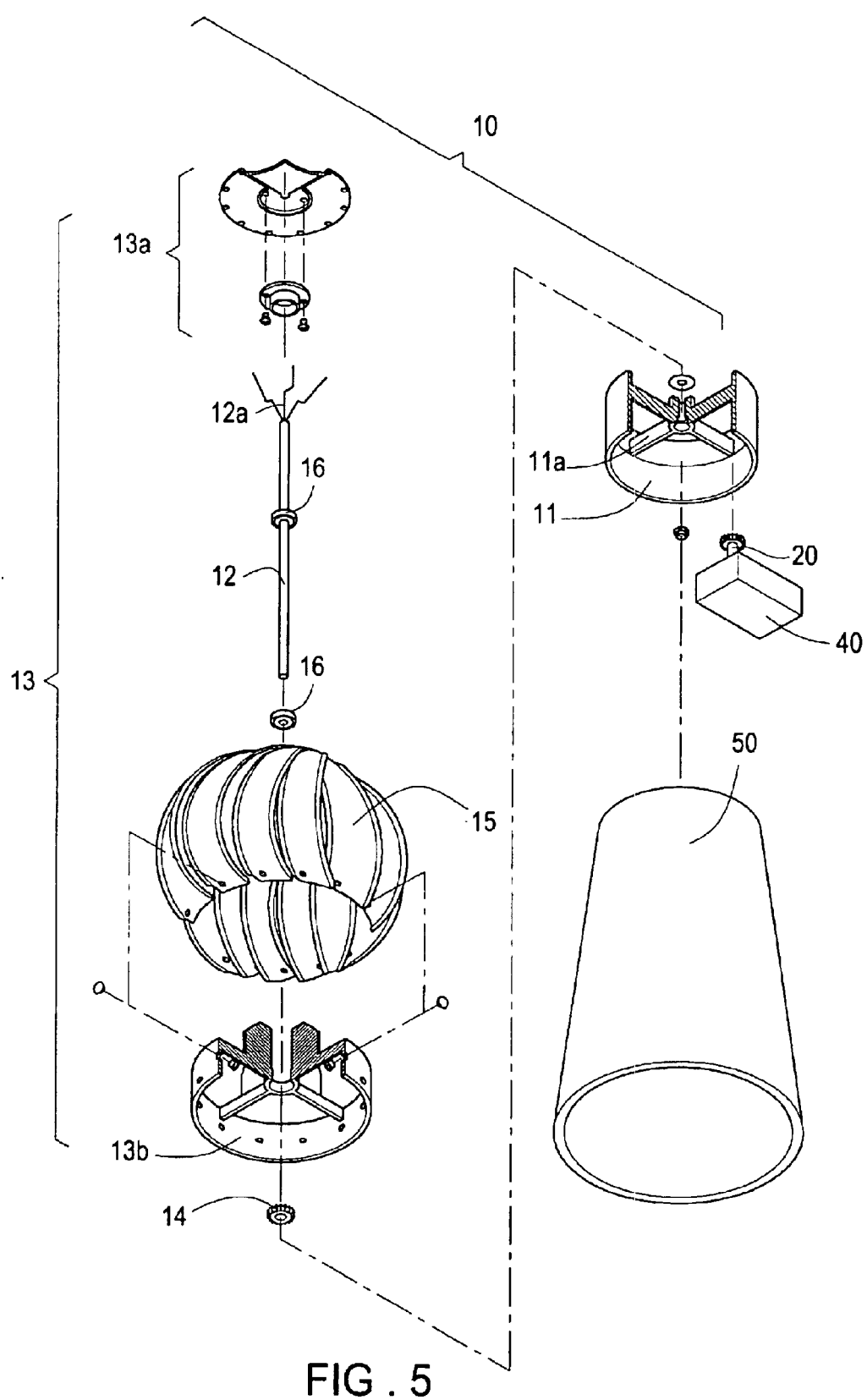
FIG. 5 is an exploded perspective view of another preferred embodiment according to the invention.

Moreover, referring to FIG. 4 that another design of a small turbine wind energy generator can generate energy by directly coupling the gear wheel 14 placed below the turbine ventilator 10 to a small generator 40, which is a safety switch design in order to prevent the burnout owing to an overrun of wind power.

To sum up, the turbine wind energy generator structure of the present invention utilizes the turbine ventilator, the current convection because of heating, the chimney/stack effect and natural breeze for achieving the objectives of decreasing the energy generation cost and encouraging greater energy efficacy. The invention further utilizes the chimney/stack effect of the tower for broadening the installation scope of the generator and shrinking the space for the utilization. The present invention is, therefore, disclosed herein for its practicability and advancement.

What is claimed is:

1. A turbine wind energy generator structure comprising a turbine ventilator, a drive system, a transmission, a generator and a tower; the characteristics of the turbine wind energy generator lie in: the turbine ventilator comprises an immovable frame, a upright fixed shaft is installed on the center whereof; the immovable frame is tubular shaped with several struts set wherein; a hub is a round shape installed on top of the fixed shaft on the immovable frame having a bearing installed in the center whereof; the bearing is coupled with the fixed shaft; a gear wheel is mounted under the center of and synchronously revolved together with a lower hub; several screw blades are positioned on the lateral sides of the upper and the lower hubs, a lightning conductor device is positioned on the top of the fixed shaft above the upper hub; the entire turbine ventilator is fixed on the tower; a control cabinet having the transmission and the generator installed inside whereof is positioned at the bottom of the tower 50.

2. The turbine wind energy generator structure of claim 1, wherein the tower is a hollow casing, which shape can be a geometrical or irregular shape.

3. The turbine wind energy generator structure of claim 1, wherein the tower is installed in an open space.

4. The turbine wind energy generator structure of claim 1, wherein the gear wheel and the transmission are to transmit the revolving energy through the drive system.

5. The turbine wind energy generator structure of claim 1, wherein the gear wheel is to tune up the rotation rate of the turbine ventilator.

6. The turbine wind energy generator structure of claim 1, wherein the generator has a battery installed for storing or outputting electric power.

7. The turbine wind energy generator structure of claim 1, wherein the gear wheel can be connected to a small generator for generating electric power.

* * * * *